3,112,996
PREPARING BORIC ACID FROM CALCIUM CONTAINING BORIC MINERALS

Carlo Garbato, Milan, Italy, assignor to Larderello Societa per Azioni per lo Sfruttamento delle Forze Endogene, Rome, Italy, a corporation of Italy
No Drawing. Filed May 11, 1960, Ser. No. 28,231
Claims priority, application Italy May 12, 1959
7 Claims. (Cl. 23—149)

The present invention relates to a process for the extraction of boric acid from colemanite or other boric minerals of calcium, which process is based on the use of any carbo-ammoniacal solution, the reagents being used, with respect to the calcium borate, in a stoichiometric quantity or in excess thereof. The process may be effected either on merely crushed minerals or ores, or on calcined and crushed ores. The operating temperature and pressure conditions may be atmospheric or above, in particular the temperature may be between atmospheric temperature and 90° C.

One particular mode of carrying out the process is as follows:

The ore or mineral after crushing to a sufficiently fine powder, is treated with a solution of ammonium bicarbonate and ammonia, or with carbon dioxide and ammonia, and the whole is stirred continuously for a few hours at a temperature ranging between room temperature and 90° C.

In this way the borate re-acts with the carbo-ammoniacal solution to form calcium carbonate and ammonium borate. The double exchange reaction is as follows:

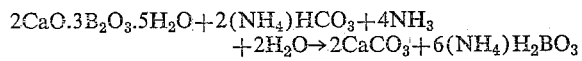

$$2CaO \cdot 3B_2O_3 \cdot 5H_2O + 2(NH_4)HCO_3 + 4NH_3 + 2H_2O \rightarrow 2CaCO_3 + 6(NH_4)H_2BO_3$$

After a lapse of time necessary to complete the reaction, the length of which may range from twenty minutes to a few hours according to the nature of the ore, the suspension is filtered and the filter panel is washed with water.

The ammoniacal solution thus obtained as filtrate which is generally of a slightly yellow colour (this colouration disappears when treating with bone charcoal) is brought up to the boil in order to concentrate it and remove ammonia which is in turn recovered.

The removal of ammonia may be carried out in this way by reason of the instability of the ammonium borate, which at that temperature is transformed into boric acid and ammonia.

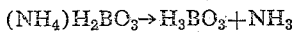

$$(NH_4)H_2BO_3 \rightarrow H_3BO_3 + NH_3$$

The last traces of ammonia are removed in the final part of this operation by scrubbing the liquid with air, followed by the recovery of $NH_3$ through washing with water.

As mentioned above, the ore must be crushed to a very fine powder since, as the reaction is a surface reaction, the efficiency is dependent to a marked degree on the available surface area.

It has furthermore been noted that the speed of the reaction varies considerably according to whether only crushed mineral is used or calcined and crushed mineral is used.

In order to obtain very high efficiencies with the crushed mineral only, it is necessary to carry out the operation in two stages. The new mineral is thus treated with a solution, which has already effected one reaction and the filter, which contains the residue from the first filtration, is used again with a fresh solution.

The use of calcined and crushed mineral has yielded excellent results, with reaction times considerably lower than those required when only crushed mineral has been used in a single stage operation.

For each of the above cases, an illustrative example is provided below:

Example I

The $B_2O_3$ ratio of the colemanite used was 41.34%. According to this value, the theoretical quantities of the reagents to be used for the treatment of 100 grams of ore can be determined.

In practice, 100 grams of ore is treated with a solution of the following composition:

| | |
|---|---|
| $(NH_4)HCO_3$ | 60 grams. |
| $NH_3$ | 50 cubic centimeters of 30% solution. |
| $H_2O$ | 800 cubic centimeters. |

The treatment is carried out in a 2000 cc. beaker, and the solution stirred by a magnetic stirrer the temperature being maintained at 45° C. by electric heating.

Effecting the extraction in counter-current the first treatment of the ore may be carried out using a solution which has already operated a first treatment.

After three hours of reaction, the suspension is filtered and while the filtrate passes to the stage of concentration and ammonia removal, the residue is treated with a fresh carbo-ammoniacal solution. The whole filtrate thus obtained is stirred for another three hours at the temperature of 45° C.; then it is filtered, the filter is washed with water and the separated ammoniacal solution is used for another reaction.

The solution passed to the concentration stage is brought up to the boil in a 2000 cc. beaker and then, when its volume has been reduced to approximately half it is poured into a large glass wherein the concentrating operation is continued and air is bubbled in to remove the last traces of ammonia.

From this solution, when the volume has been considerably reduced (for example to about 200 cc.), the boric acid is crystallized by cooling and the acid, separated from the liquid by filtering, is washed and dried in a drying oven, while the liquid returns to the cycle in the concentration stage.

Operating in this way, efficiencies of 98.6%, 99.9%, 92.5% and 98.9% have been obtained.

Example II

Although the $B_2O_3$ ratio of the ore is slightly higher, a carbo-ammoniacal solution is used of the same composition as in the previous case, and the process is similar to that above described. In this case, however, the operation is effected in a single stage and for a considerably shorter time.

With a reaction time of three hours an extraction efficiency of 97% has been obtained. Shorter times have recorded slightly lower efficiencies.

What I claim is:

1. A process for preparing boric acid from calcium containing boric minerals, comprising treating said minerals in finely comminuted condition with at least a stoichiometric quantity of an ammonium bicarbonate solution and excess free ammonia to produce a precipitate of calcium carbonate and a solution of ammonium borate, then separating the calcium carbonate from the solution of ammonium borate, subsequently heating said solution to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia, and cooling said solution to crystallize free boric acid.

2. A process for preparing boric acid from calcium containing boric minerals, comprising treating said minerals in finely comminuted condition with an aqueous solution containing ammonium bicarbonate and excess free ammonia in an amount sufficient to produce a precipitate of calcium carbonate and a solution of ammonium borate, then separating the calcium carbonate from the solution of ammonium borate, subsequently heating said solution to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia, and cooling said solution to crystallize free boric acid.

3. A process for preparing boric acid from calcium containing boric minerals, comprising the steps of comminuting said minerals, calcining the same, treating them with an aqueous solution of ammonium bicarbonate and excess free ammonia in an amount sufficient to produce a precipitate of calcium carbonate and a solution of ammonium borate, then separating the calcium carbonate from the solution of ammonium borate, subsequently heating said solution to cause evolution of free ammonia and formation of free boric aicd in said solution and to concentrate said solution, continuing said heating until a major portion of the ammonia has been driven off while maintaining the boric acid in solution, thereafter stripping said solution with a stream of gas substantially to remove the last traces of ammonia, and cooling said solution to crystallize free boric acid.

4. A process for preparing boric acid from calcium containing boric minerals, comprising treating said minerals in finely comminuted condition with an aqueous solution containing ammonium bicarbonate and excess free ammonia at a temperature between 20° C. and 90° C. and in an amount sufficient to produce a precipitate of calcium carbonate and a solution of ammonium borate, then separating the calcium carbonate from the solution of ammonium borate, subsequently heating said solution to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia, and cooling said solution to crystallize free boric acid.

5. A process for preparing boric acid from calcium containing boric minerals, comprising treating said minerals in finely comminuted condition with an aqueous solution containing ammonium bicarbonate and excess free ammonia in an amount sufficient to produce a precipitate of calcium carbonate and a solution of ammonium borate, then separating the calcium carbonate from the solution of ammonium borate, subsequently heating said solution to boiling temperature to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia, and cooling said solution to crystallize free boric acid.

6. A process for preparing boric acid from calcium containing boric minerals, comprising treating said minerals in finely comminuted condition with an aqueous solution containing ammonium bicarbonate and excess free ammonia in an amount sufficient to produce a precipitate of calcium carbonate and a solution of ammonium borate, then separating the calcium carbonate from the solution of ammonium borate, subsequently heating said solution to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia while continuing to concentrate said solution to a volume substantially less than one half its original volume, and cooling said solution to crystallize free boric acid.

7. A process for preparing boric acid from calcium containing boric minerals, comprising treating said minerals in finely comminuted condition with an aqueous solution containing ammonium bicarbonate and excess free ammonia in an amount sufficient to produce a precipitate of calcium carbonate and a solution of ammonium borate, then separating the calcium carbonate from the solution of ammonium borate, subsequently heating said solution to cause evolution of free ammonia and formation of free boric acid in said solution and to concentrate said solution, continuing said heating until a major portion of the ammonia has been driven off while maintaining the boric acid in solution, thereafter stripping said solution with a stream of gas substantially to remove the last traces of ammonia, cooling said solution to crystallize the boric acid, separating said boric acid from the resulting mother liquor, thereafter washing and drying the thereby produced boric acid.

References Cited in the file of this patent

UNITED STATES PATENTS

| 1,046,594 | Hoyler | Dec. 10, 1912 |
| 1,108,129 | Burger | Aug. 25, 1914 |
| 1,892,341 | Hackspill et al. | Dec. 27, 1932 |
| 3,018,163 | May et al. | Jan. 23, 1962 |

OTHER REFERENCES

Winkler: J. Am. Chem. Soc., vol. 29, pages 1366–1371 (1907).